United States Patent [19]

Golemis et al.

[11] Patent Number: 5,775,232
[45] Date of Patent: Jul. 7, 1998

[54] BRIDGE PLATE FOR A MASS TRANSIT VEHICLE

[75] Inventors: Fotios Golemis, Skokie; Alf J. Olsen, Elk Grove Village, both of Ill.

[73] Assignee: Vapor Corporation, Niles, Ill.

[21] Appl. No.: 799,165

[22] Filed: Feb. 14, 1997

[51] Int. Cl.⁶ .................................................. B60R 3/00
[52] U.S. Cl. ............................................. 105/458; 414/537
[58] Field of Search ................................... 105/436, 433, 105/393, 458; 414/537, 538, 921; 280/163, 166

[56] References Cited

U.S. PATENT DOCUMENTS

| | | | |
|---|---|---|---|
| 3,730,361 | 5/1973 | Haynes | 105/436 |
| 4,131,209 | 12/1978 | Manning | 105/433 |
| 4,188,889 | 2/1980 | Favrel | |
| 4,759,682 | 7/1988 | Hood | 105/433 |
| 4,909,700 | 3/1990 | Fontecchio et al. | 414/921 |
| 5,312,071 | 5/1994 | Eilenstein-Wiegmann et al. | |
| 5,357,869 | 10/1994 | Barjolle et al. | 105/436 |
| 5,393,192 | 2/1995 | Hall et al. | 414/921 |
| 5,636,399 | 6/1997 | Tremblay et al. | 414/537 |

FOREIGN PATENT DOCUMENTS 86113060  4/1987  European Pat. Off. .

OTHER PUBLICATIONS

Alsthom, The Grenoble Light Rail Vehicle, advertising brochure, 4 pages, no date.

Primary Examiner—Mark Tuan Le
Attorney, Agent, or Firm—Francis J. Lidd

[57] ABSTRACT

A power operated retractable floor extension, extending outward from the floor of a mass transit vehicle. When extended, the floor portion bridges any gap between the vehicle floor and adjacent platform, thereby providing improved passenger access to the vehicle. Generally speaking, the extended member complies with existing United States Federal Regulations.

8 Claims, 9 Drawing Sheets

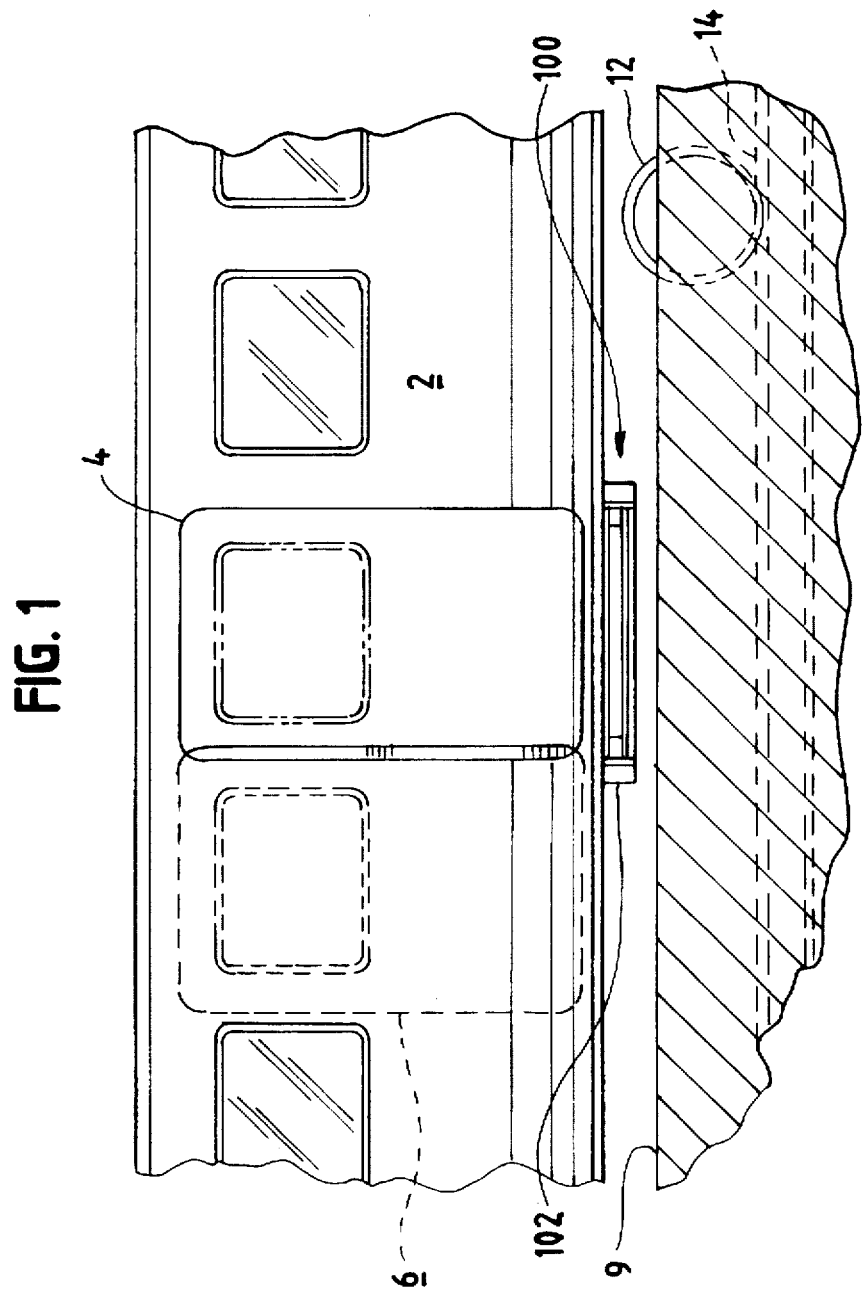

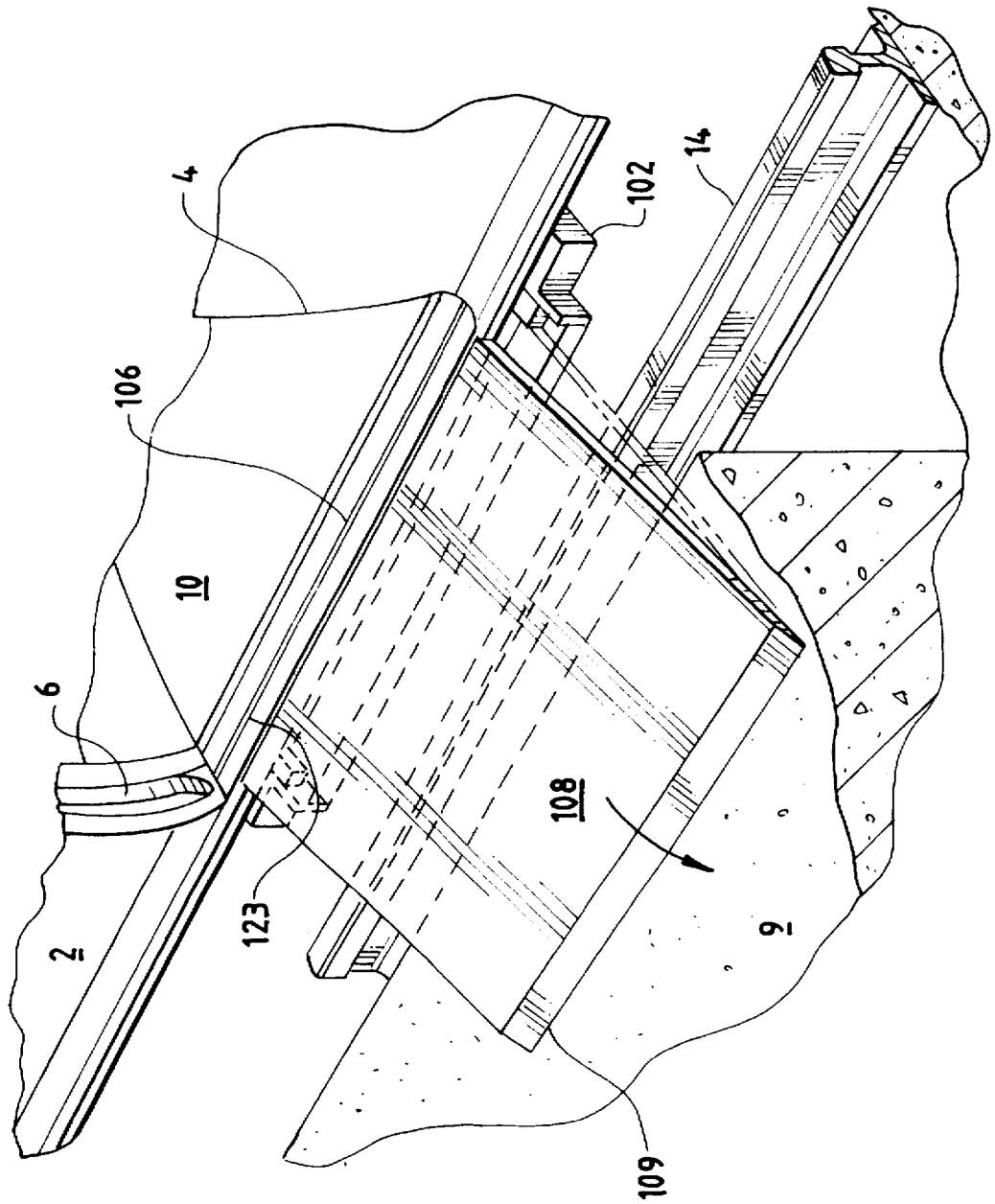

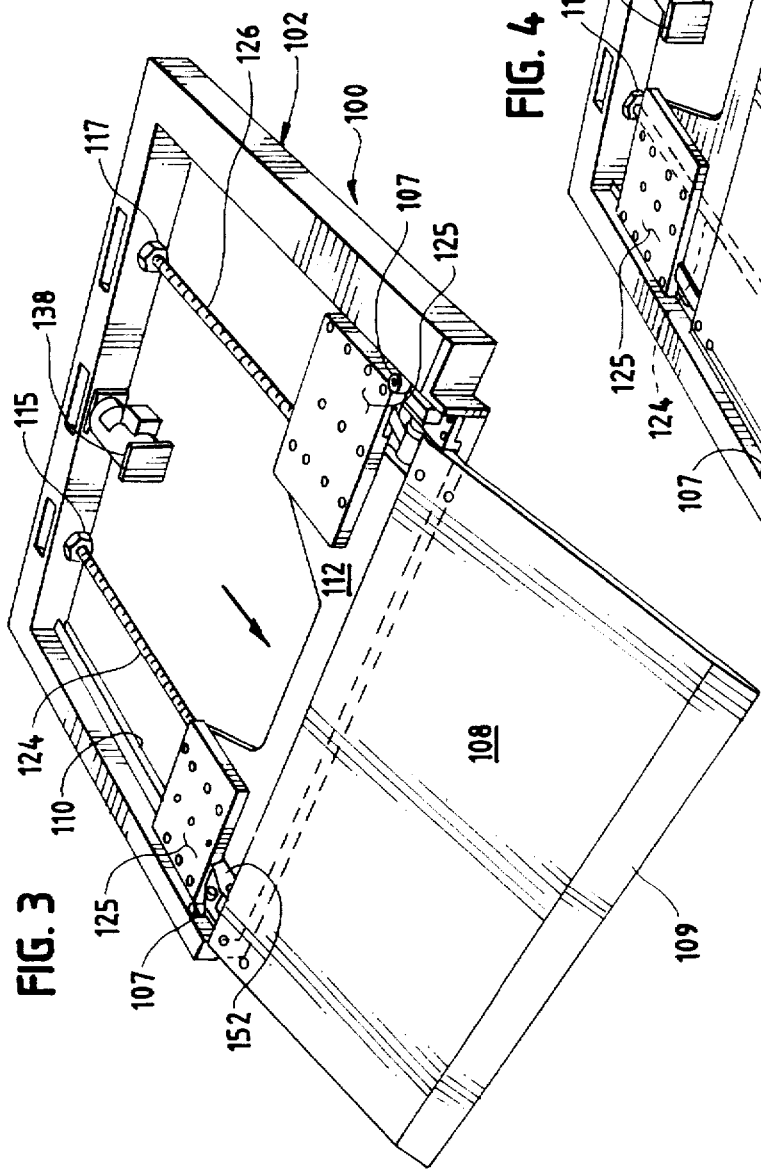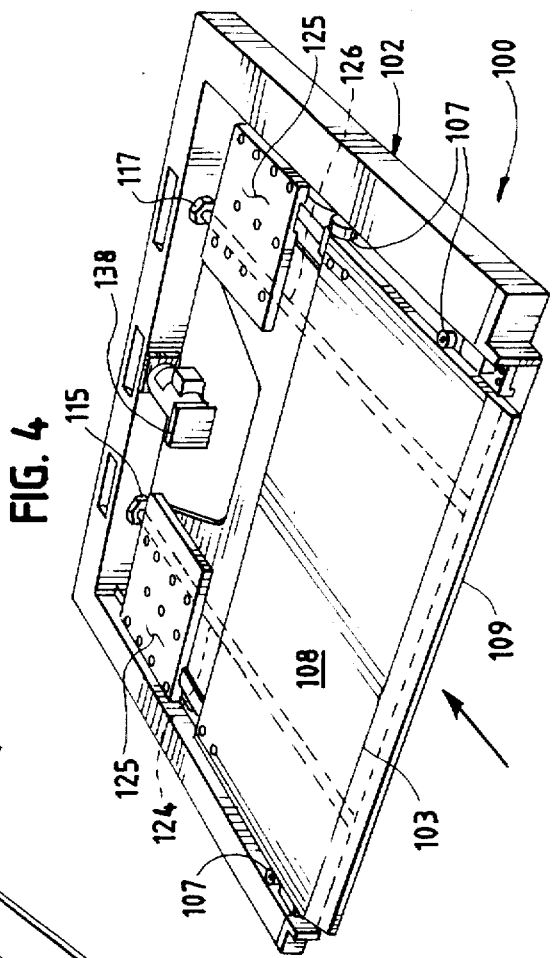

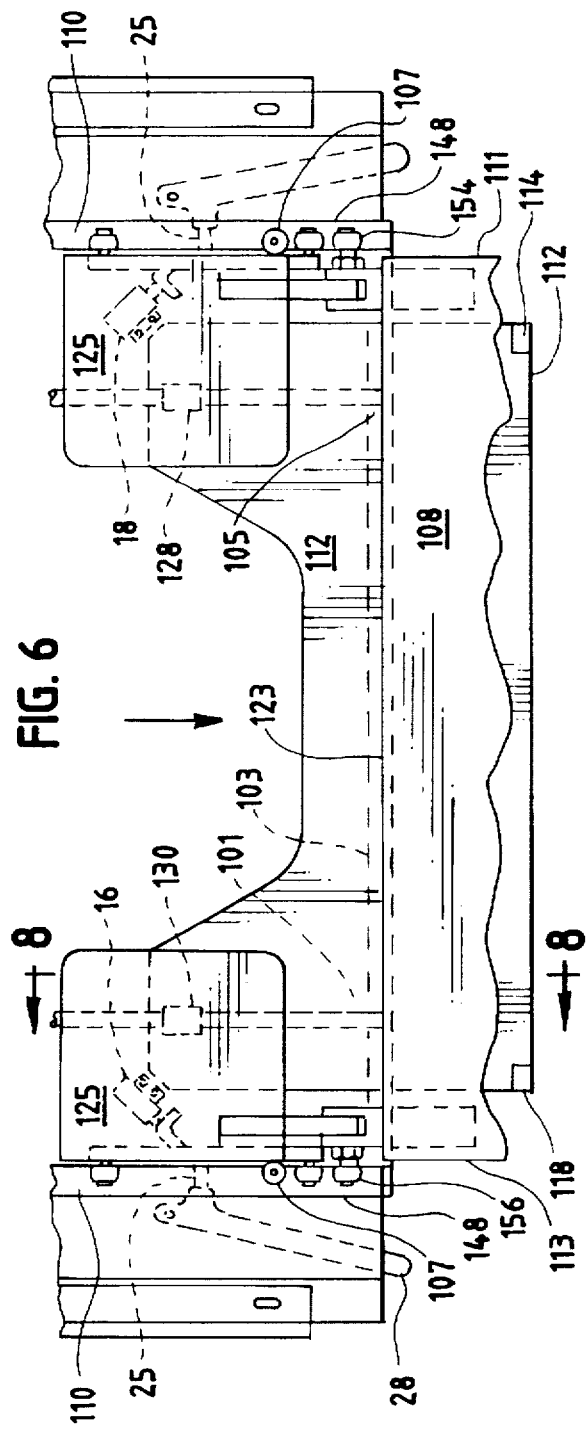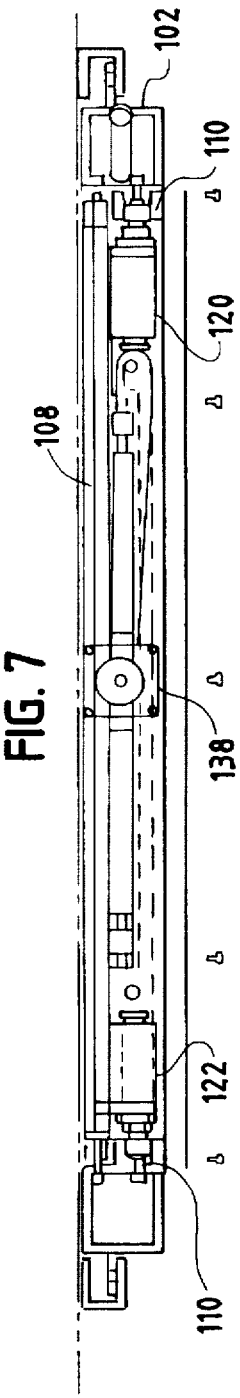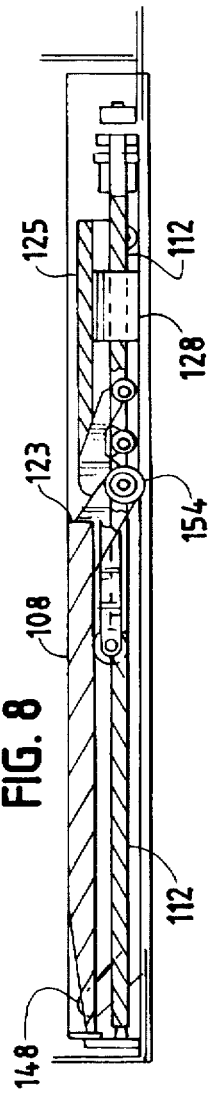

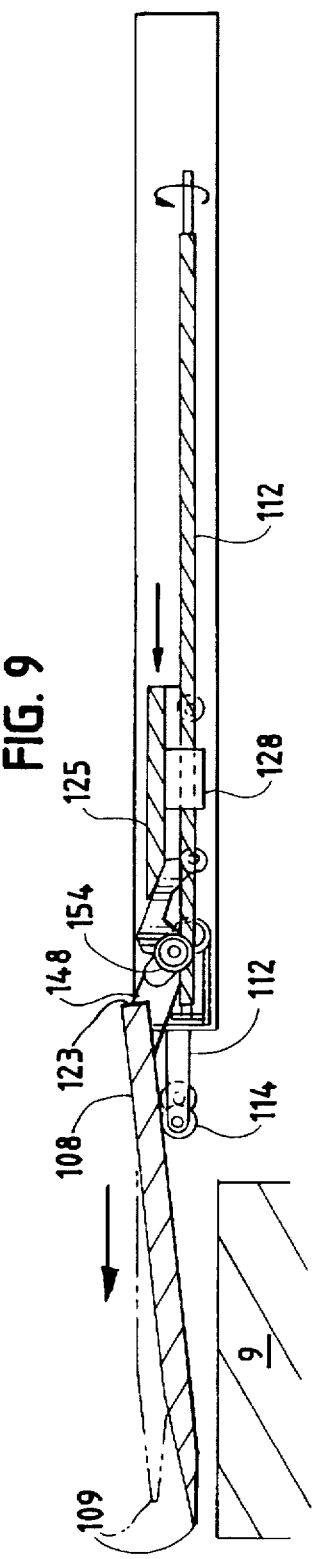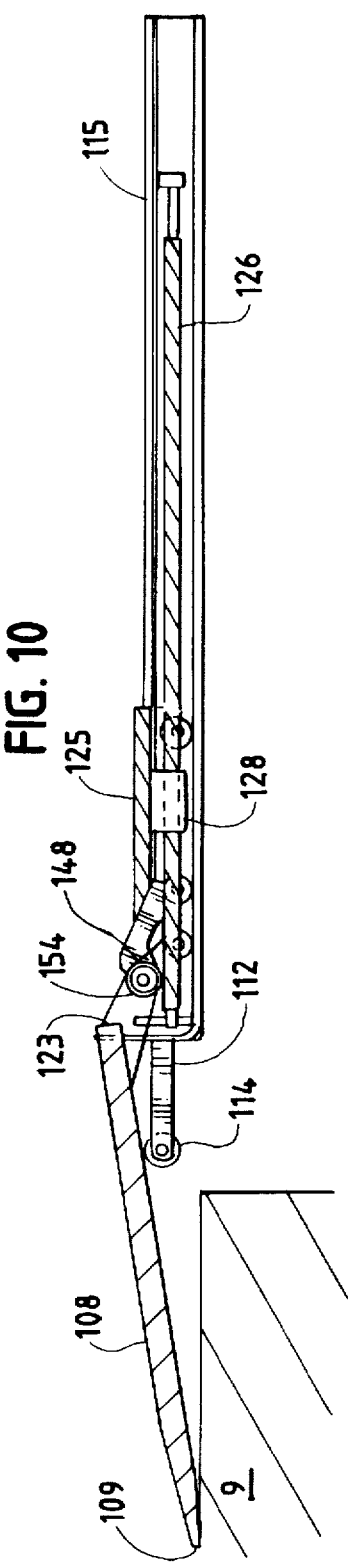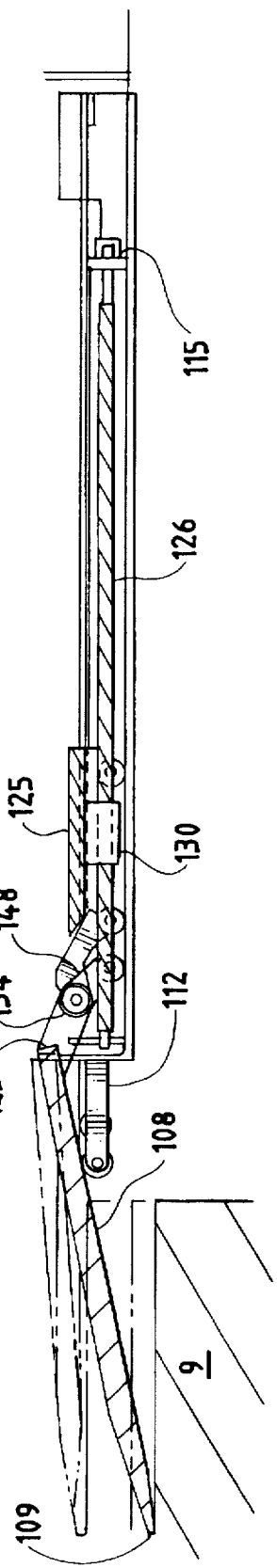

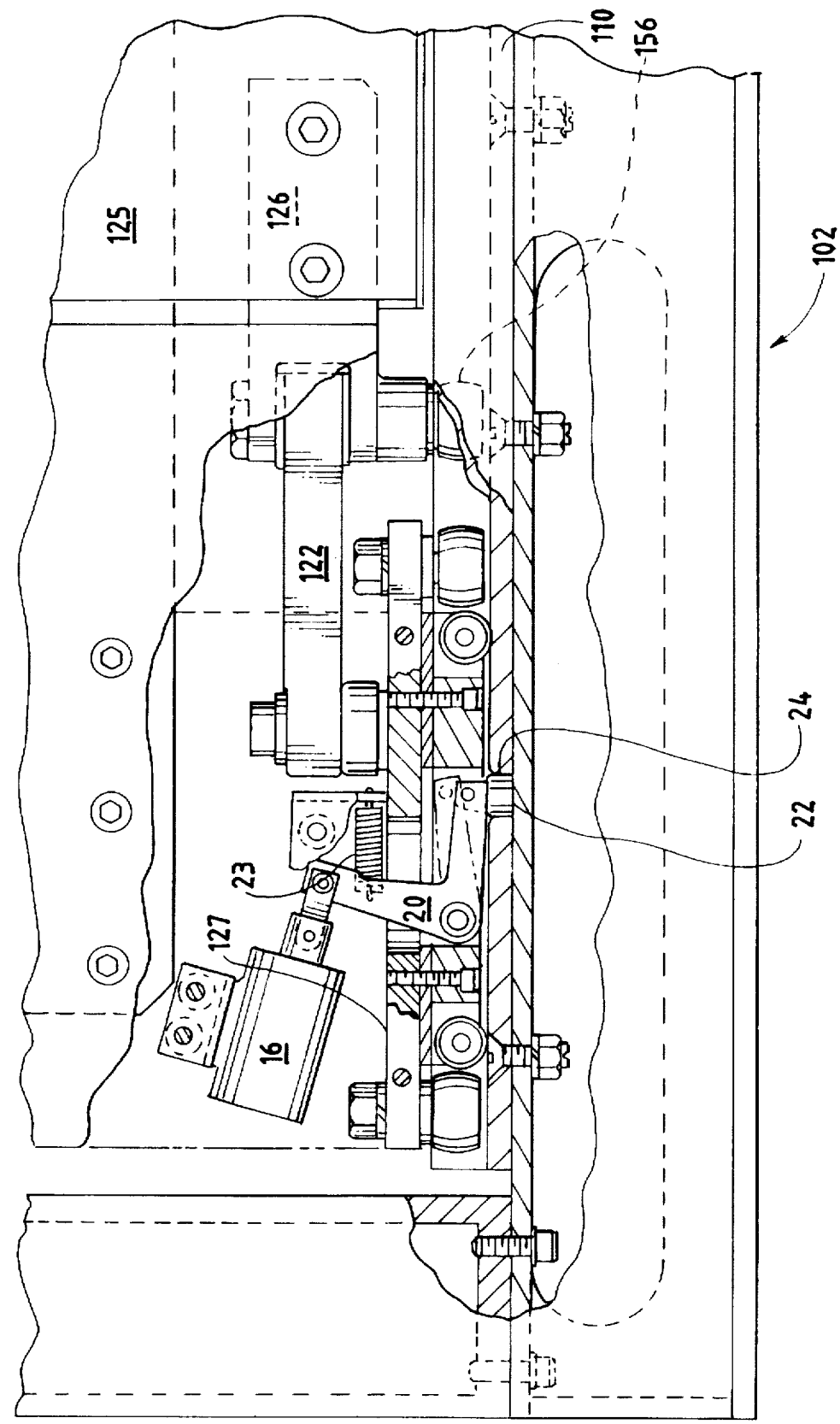

BRIDGE PLATE FOR A MASS TRANSIT VEHICLE

BACKGROUND OF THE INVENTION

This invention relates generally to providing improved passenger access to mass transit vehicles, and more particularly concerns devices which extend outward from the side wall of a mass transit vehicle generally at floor level in order to bridge or cover any existing gap and level difference between the transit vehicle floor and an adjacent platform or other exit area.

Known devices which attempt to accomplish the above described "bridging" action include European Patent Application 94400475.3 (Publication No. 0618125A1), and European Patent Application 86113060.7 (Publication No. 08.04.87). However, these devices either do not provide smooth transition between the car floor and platform and require extensive modification to the vehicle structure in order to accommodate the operative portions of the bridge plate. The device disclosed herein provides a solution to the above mentioned difficulties in that it employs a "cartridge" design, thereby eliminating the requirement for extensive vehicle modifications in that it occupies a minimal amount of space directly underneath the door openings in a typical transit vehicle. Further, the bridge plate disclosed herein has the capability to align its inboard edge with the floor of the vehicle, thereby providing smooth transition between the floor of the vehicle and the bridge plate on exiting or entering the car. This feature provides superior conditions for passengers exiting the car door and moving across the bridge plate to an adjacent platform or other surface. This feature is particularly advantageous for wheeled vehicles such as wheel chairs, wheeled infant transport devices, passengers using canes, crutches, or walking sticks and other equipment requiring smooth surfaces for proper use.

Therefore, it is an object of this invention to provide a bridge plate assembly which can be applied to transit vehicles without major modifications to the vehicular structure.

It is an additional object of this invention to provide a bridge plate assembly which, when deployed, provides an essentially seamless transition from the floor of the vehicle to the adjacent platform.

It is an additional object of this invention to provide a bridge plate assembly which accommodates a wide variation in platform-car body gap, and platform height.

It is a further object of this invention to provide a bridge plate which, in the event of failure in the drive system, can easily be manually retracted into a stowed position, thereby allowing the transit vehicle to proceed with normal operation.

SUMMARY OF THE INVENTION

The bridge plate disclosed herein utilizes a "cartridge" design which is easily applied to a wide variety of transit vehicles. In application, the unit mounts under the car more directly under the car door opening. This type of installation requires a minimum of accommodation in the car body structure.

Deployment, i.e., extension or retraction of the bridge plate, is accomplished through the use of high efficiency drive screws incorporating low operating friction. This feature allows convenient manual retraction or stowing of the bridge plate in the event of car power failure or other equipment problems which prevent power retraction.

In operation, the bridge plate is locked in both stowed and deployed positions through the use of symmetrical solenoid latches. Manual operation is accomplished through use of release levers conveniently located at the outer edges of the bridge plate when in a deployed or extended position.

An attendant electrical control system synchronizes bridge plate deployment with the door opening operation. In use, the bridge plate control interlocks bridge plate deployment with door opening, ensuring availability of the bridge plate prior to door opening.

DESCRIPTION OF THE DRAWINGS

FIG. 1 is a partial plan view of the bridge plate assembly in place on a "typical" rail car transit application.

FIG. 2 is a partial perspective of the bridge plate of the invention deployed under an opened door in a rail transit vehicle.

FIG. 3 is a perspective view of the bridge plate of the invention, particularly showing the bridge plate in an extended position.

FIG. 4 is an additional perspective view of the bridge plate assembly of FIG. 3 with the bridge plate in a fully stowed position, particularly showing support plates and the drive motor.

FIG. 6 is an additional plan view of the bridge plate of the invention in a fully opened position, particularly showing the manual lock levers.

FIG. 7 is a partial car side view, i.e., opposite to that of FIG. 1, of the bridge plate assembly of the invention, particularly showing mounting of the cartridge assembly underneath a rail transit car.

FIG. 8 is a partial section along the lines 8—8 of FIG. 6, particularly showing the bridge plate in a stored position under car and including bridge plate rollers and guide tracks.

FIG. 9 is a section view similar to that of FIG. 8, particularly showing the bridge plate in a partially deployed condition with the bridge plate rollers partially extended into the upwardly sweeping portion of assembly guide tracks.

FIG. 10 is a further sectional view of FIG. 9, particularly showing the bridge plate guide rollers occupying the upwardly sweeping portion of the guide track.

FIG. 11 is a further sectional view of the assembly of FIG. 10, particularly showing bridge plate deployment with respect to variable curb or platform heights.

FIG. 12 is a partial tearaway view of the bridge plate guide track and frame, particularly showing the bridge plate in a stowed and locked position.

DETAILED DESCRIPTION OF OPERATION

Figure 5:
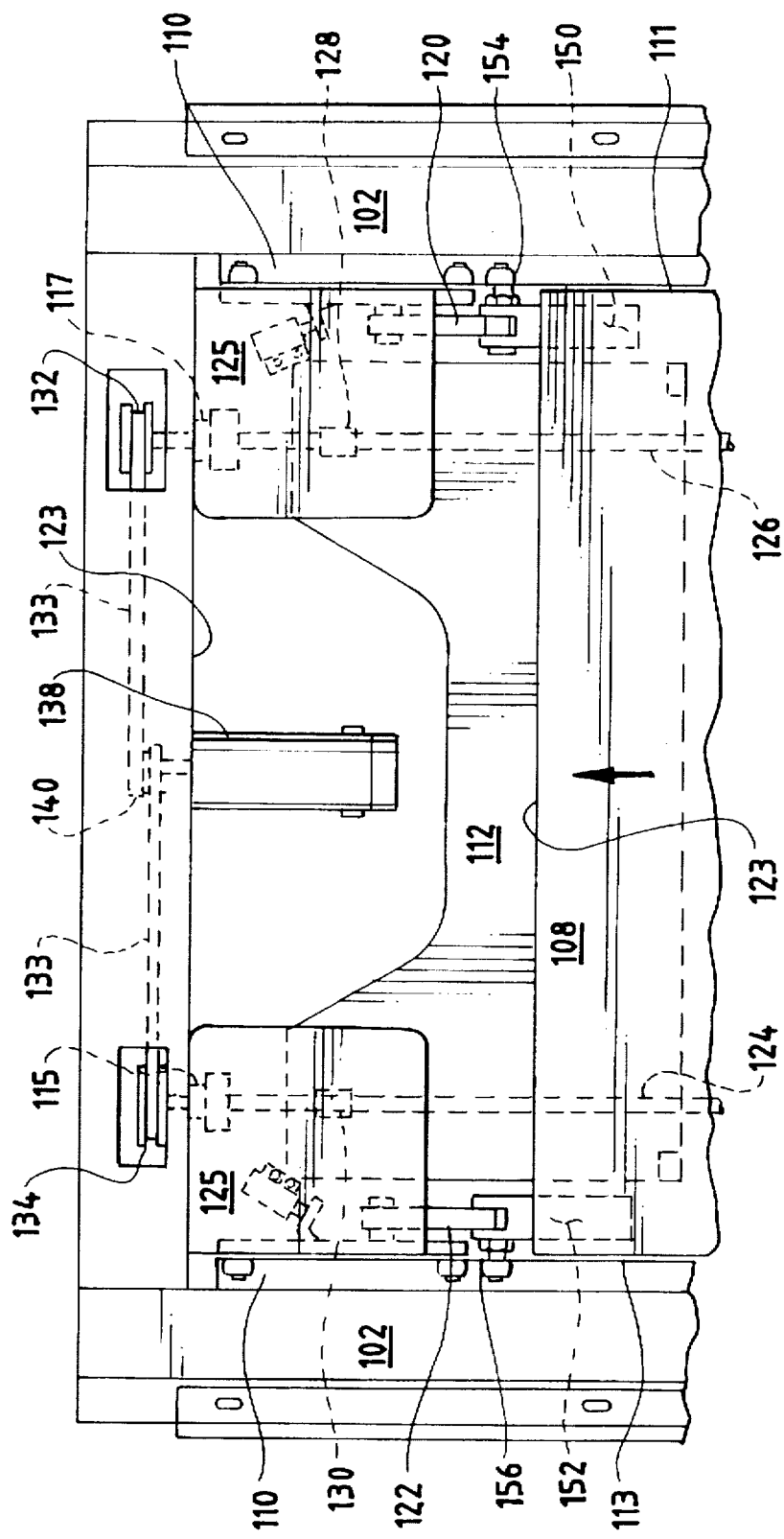
FIG. 5 is a partial plan view of the bridge plate assembly of the invention in a partially stowed position, however, showing drive screws and lock solenoids.

The cartridge like assembly 100 of the bridge plate of the invention is suitably attached under a vehicular door opening as shown in FIG. 1. The mounting provides for locating the bridge plate assembly 100 immediately underneath the floor 10 of vehicle 2 having wheels 12 operating on track 14, having its external end 109 parallel to and approximately equal in width to its associated and adjacent door opening.

The bridge plate edges adjacent and perpendicular to the bridge plate leading end 109 (Reference FIG. 2) incorporate suitably attached guide rollers 107. Guide rollers 107 cooperate with internal track 110 of the bridge plate assembly 100 so as to provide rolling support for the bridge plate 108 for movement in an outward direction of the assembly 100 so as to position the bridge plate 108 directly underneath the door opening 4 of vehicle 2. Opening door 6 of vehicle 2 moves when bridge plate 108 to its fully extended position (Reference FIG. 5).

With particular reference to FIGS. 8 through 11, the bridge plate 108 is shown in fully withdrawn or stowed partially extended, and fully withdrawn or stowed positions. In the stowed position, bridge plate right hand edge 111 and bridge plate left hand edge 113 are adjacent and parallel to corresponding portions of the frame assembly 102.

Extension and withdrawal of the bridge plate 108 is provided by rotation of drive screws 124 and 126. Drive screws utilized may be of re-circulated ball design supplied by Nook Industries of Cleveland, Ohio, designated as 0631-0500 SRT. Drive screws 124 and 126 are journaled in the leading end 103 of the frame assembly 102 at positions 105 and 101. Similarly, the inboard ends of drive screws 124 and 126 are journaled at 115 and 117 located in the inboard end of frame assembly 102.

Also located adjacent to and journaled in the inboard end portion of frame assembly 102 are drive pulleys 132 and 134 rotatably mounted on drive screws 124 and 126 at a point adjacent to drive screw journals 115 and 117.

Rotation of pulleys 132 and 134 is obtained through drive belts 132 and 134, driven by drive motor 138 acting through a compound drive motor shaft sprocket 140.

Movement of the bridge plate 108 from a stowed position directly underneath the vehicular floor to an outboard position immediately adjacent to the door opening is obtained, by energizing drive motor 138, thereby rotating screws 124 and 126 and corresponding travel of drive nuts 128 and 130 suitably attached to main plate or bridge plate support 112 through main plate attachment plate 125 (Reference FIG. 2). Bridge plate support 112 is attached to bridge plate 108 by pivoting links 150, 152 (right hand and left hand, respectively), having rollers 154 and 156 cooperating with track 110 for moving bridge plate 108. In reference to FIGS. 8 through 11, with the bridge plate support 112 extended, bridge plate support 112 provides following under plate support through rollers 114 and 118.

A particularly important part of the invention disclosed herein is the provision for alignment of the bridge plate inboard end 123 with the adjacent vehicle floor edge 106. This is accomplished through the compound action of tracks 110 mounted internal of the frame assembly 102 and adjacent to bridge plate edges 111 and 113, respectively (References 5 and FIG. 14). Tracks 110 have upwardly inclined portions 147 and 148 (Reference FIG. 14), respectively. Tracks 110 cooperate with rollers 154 and 156 mounted in bridge plate roller brackets 120 and 122 for guiding the bridge plate 108 in motion generated by rotating drive screws 124 and 126, from inboard position (Reference FIG. 8), to a fully extended or deployed position (Reference FIGS. 10 and 11). Alignment of the inboard or trailing end 123 of the bridge plate 108 with the vehicle floor edge 104 is achieved as follows:

In its inboard or stowed position, bridge plate rollers rest on the level portion of track 110. On rotation of drive screws 124 and 126, deployment of the bridge plate 108 proceeds with movement away from the inboard edge portion 123 of frame assembly 102. Continued movement of the bridge plate 108 along track 110 provided by rollers and roller brackets 120 and 122 until rollers 154 and 156 enter the upward ends 147 and 148 of frame tracks. At this point, upward movement of the roller and bracket raises the trailing edge 123 of the bridge plate 108, placing it in alignment with the vehicle floor edge 106.

Figure 13:
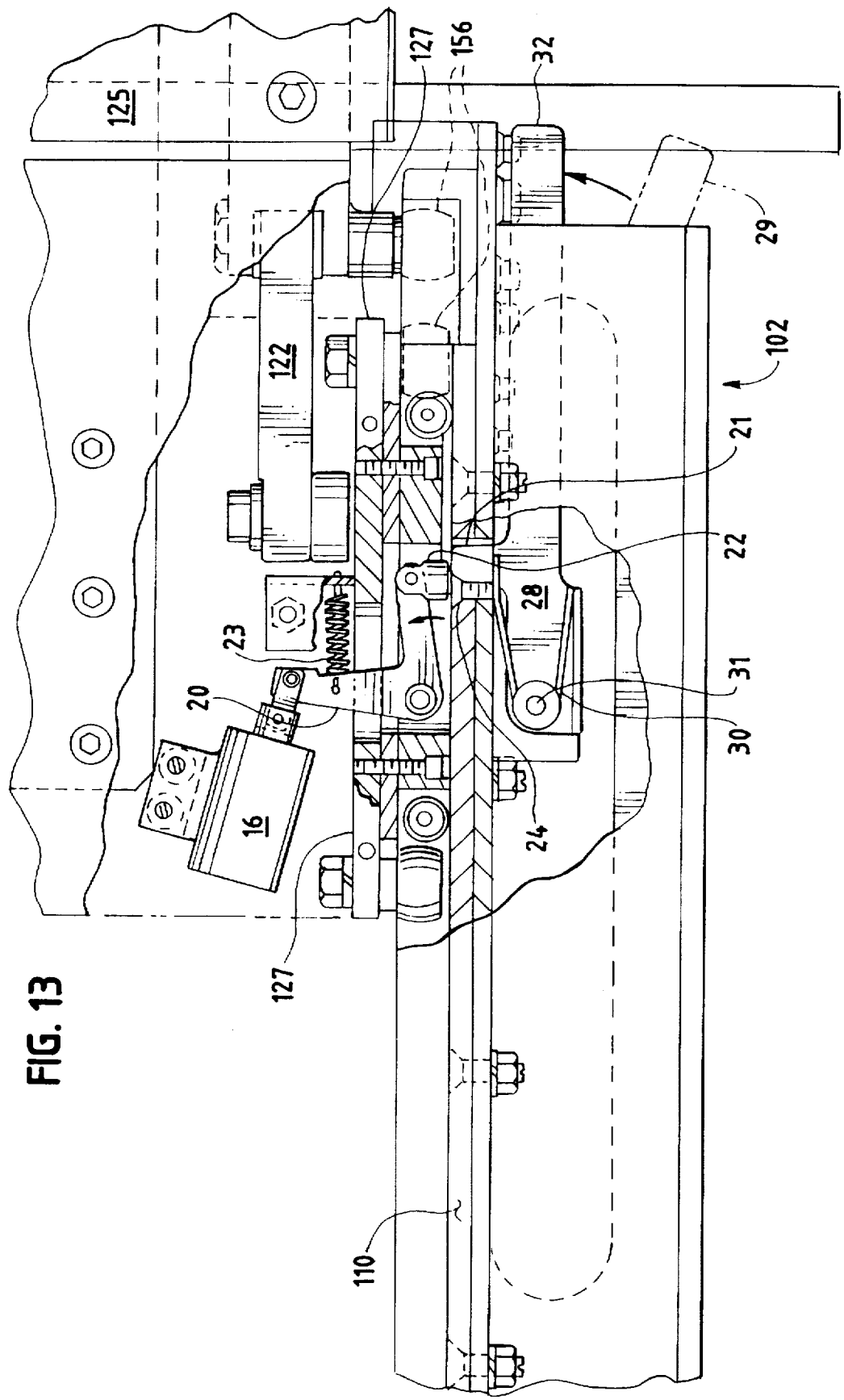
FIG. 13 is an additional tearaway view of the bridge plate guide track and frame with the bridge plate in a fully extended position, particularly showing a manual lock release from the locked and deployed position.

An additional inventive aspect of the bridge plate disclosed herein is incorporated in a method of locking or retaining the bridge plate in its fully stowed and/or fully extended or deployed position. As the bridge plate disclosed herein is symmetrical, the following discussion pertains to the left hand portion, i.e., that associated with drive screw 124 and drive plate 125 as discussed above. With particular reference to FIGS. 12 and 13, on extension of the bridge plate 108 to a fully deployed position (Reference FIG. 13), lock lever 20, pivotally attached to the drive plate link 127 has one end rotatably fixed to a solenoid 16 mounted on the under side of drive plate 125. The opposite end of lock lever 20 is rotatably attached to lock plunger 22 as shown Lock lever 20 is biased by spring 21 to rotate in a clockwise direction.

Figure 14:
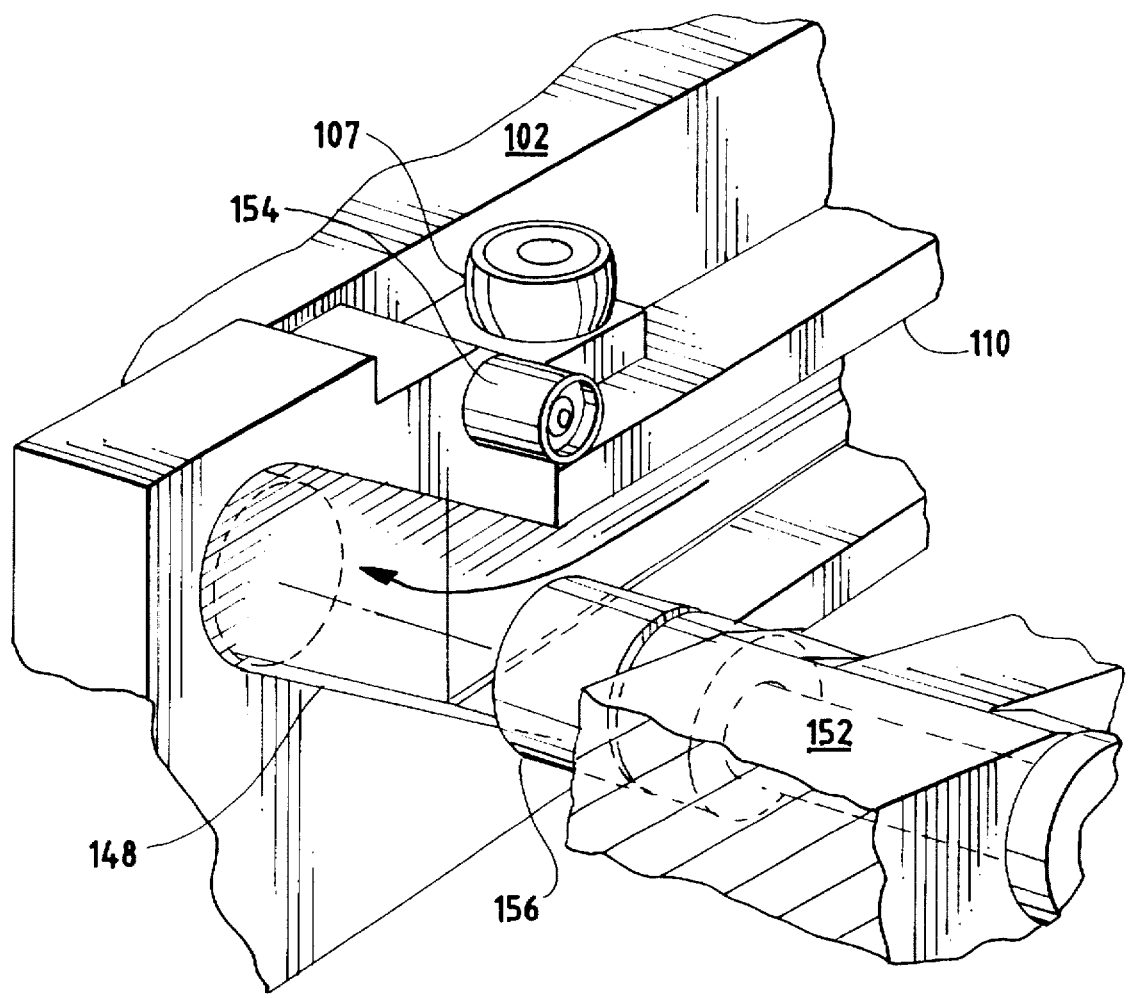
FIG. 14 is a partial perspective view of the bridge plate guide roller and guide track relationship, particularly showing the upwardly sweeping portion of the guide track and the associated bridge plate roller located therein.

Lock plunger 22 cooperates with aperture 24 in the bridge plate frame 102 so that when its locked position held by spring 21, as shown in FIG. 12, the bridge plate internal frame track 110 prevents bridge plate linkage assembly 127 from motion along track 110 (Reference FIG. 14). Lock lever 20 is rotatably biased by spring 23, thereby maintaining a positive clockwise rotation on the link 20. In operation, when motion of the bridge plate assembly, particularly linkage 127 moving along track 110, approaches the aperture 24, lock pin or plunger 22 enters the aperture, thereby locking the bridge plate in a fully withdrawn or stowed position as shown in FIG. 12.

Similarly, when the bridge plate is extended to its operating position, the spring biased lock lever and plunger 22 enter an aperture 25 (Reference FIG. 6), thereby locking the bridge plate in an extended condition.

As indicated above, to deploy the bridge plate disclosed herein, solenoid 16 is energized along with drive motor 138. Energization of solenoid 16 withdraws lock plungers 22 from apertures 24 and 25, thereby releasing the bridge plate assembly, wherein rotation of drive screws 124 and 126 move bridge plate drives 125 and bridge plate 108 outward of the vehicle side wall 4 to a fully deployed position under opening 4 in car side wall 2. As indicated above, operation of link drive roller 156 in a portion 148 of the internal track 110 raises the inboard or trailing edge of the bridge plate 106 to approximately the level of car floor 10, thereby providing an essentially unbroken surface from the interior of car 2 side wall 2 to an adjacent platform or other structure 9.

An additionally important feature of the invention disclosed herein is provision for manual release of the bridge plate drive should any aspect of the automatic drive and/or locking system fail in operation. Those skilled in the art will readily understand that any failure of the bridge plate in a deployed position, if not easily rectified, essentially render the associated vehicle inoperable.

Provision for manual retraction of the bridge plate assembly is provided through the use of manual unlock lever 28 (Reference FIG. 13). As shown in FIG. 13, the unlock lever is journaled at one end adjacent to the lock aperture 24 in the frame assembly 110 having a protrusion 21 as shown. Unlock lever 28 further is pivoted at end 31. Pivoted end 31 is fixed to the bridge plate frame 110. The pivot 31 further includes a torsion spring 30 for biasing the lever 28 in position 29.

In operation, with the bridge plate in its fully extended or deployed position (Reference FIGS. 6 and 13), the lock plunger 22 would normally occupy aperture 24, thereby locking the bridge plate in a fully opened position for use by exiting or entering passengers. However, should some failure of either a control system energizing solenoid 16 or the solenoid itself, plunger 22 on lock lever 20 would continue to be biased by spring 21 into aperture 24, thereby locking bridge plate 108.

However, utilization of unlock lever 28 and manual movement of lever 28 from position 29 to position 32, as shown, would move protrusion 21 through aperture 27, thereby moving plunger 22 out of its locked position. Removal of manual force on 32 would allow unlock lever 28 to return to an unlocked position, thereby allowing manually induced motion of the entire bridge plate 108 to back drive drive screws 124 and 126 by drive nuts 130 and 128, thereby moving bridge plate 108 to a fully stowed position, as shown in FIG. 12.

Thus, it is apparent that there has been provided in accordance with the invention a retractable bridge plate which fully satisfies the objects, aims and advantages as set forth in the above description. While the bridge plate has been described in conjunction with specific embodiments thereof, it is evident that many alternatives, modifications and variations will be apparent to those skilled in the art on reading the foregoing description. Accordingly, it is intended to embrace any and all such alternatives, modifications and variations as fall within the spirit and broad scope of the appended claims.

We claim:

1. A bridge plate cartridge in combination with a transit vehicle retrofitted with said bridge plate cartridge, comprising:

said bridge plate cartridge including a bridge plate having an upper surface, mounting means for mounting said bridge plate to said transit vehicle, and drive means for moving said bridge plate between a stowed position and an extended position;

said transit vehicle including a vehicle body structure provided with a floor surface, a vehicle body outer surface located beneath said floor, and a passenger door opening located above said floor surface; and wherein said bridge plate cartridge is mounted directly to said vehicle body outer surface beneath said floor surface and said passenger door opening, such that said mounting means aligns said upper surface of said bridge plate with said floor surface when said bridge plate is moved to said extended position so as to provide essentially uninterrupted surface from said floor surface to said upper surface of said plate bridge plate.

2. The invention of claim 1 further comprising means in said mounting means for selectively locking and unlocking said bridge plate in said stowed or extended position.

3. The invention of claim 2 further comprising means for manually unlocking said bridge plate when said bridge plate is locked in said extended position.

4. A transit vehicle retrofitted with a device for bridging a gap between a floor of the transit vehicle and an adjacent platform, comprising:

a vehicle body having a side wall, a floor, an under car outer surface located under said floor, and a door opening located above said floor; and said device having a frame attached directly to said under car outer surface located under said floor and said door opening, said frame having inboard and outboard ends parallel to said side wall and frame edges interconnecting said inboard and outboard ends, tracks mounted on said frame edges, a plate mounted in said frame, said plate having plate edges provided with roller means for cooperating with said tracks for plate motion along said tracks, drive means for driving the plate along the tracks, and means in said tracks for moving an end of said plate to the level of said floor when said plate is fully extended.

5. The invention of claim 4 further comprising:

lock means on said plate;

lock means on said frame adjacent said plate lock means;

means actuating said plate lock means, said plate and frame lock means coacting to prevent plate motion when said plate is in an extended position;

manual unlock means on said frame, said unlock means deactuating said frame and plate locks, thereby enabling plate movement from extended to stowed positions.

6. The invention of claim 5 wherein said drive means includes powered rotating drive screws and cooperating nuts for moving said plate.

7. The invention of claim 5 wherein said plate and frame lock means include a solenoid actuated plunger and cooperating aperture, respectively.

8. The invention of claim 5 wherein said manual unlock means includes means separating said solenoid actuated plunger and cooperating aperture, thereby manually unlocking said plate.

* * * * *